United States Patent
Cheng

(10) Patent No.: US 8,718,692 B2
(45) Date of Patent: May 6, 2014

(54) METHOD OF REPORTING MEASUREMENT REPORT EVENTS

(75) Inventor: Tsung-Yo Cheng, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 350 days.

(21) Appl. No.: 13/271,197

(22) Filed: Oct. 11, 2011

(65) Prior Publication Data

US 2013/0029702 A1   Jan. 31, 2013

(30) Foreign Application Priority Data

Jul. 25, 2011   (TW) ............................. 100126201 A

(51) Int. Cl.
    *H04B 7/00* (2006.01)
(52) U.S. Cl.
    USPC .................. 455/500; 455/424; 455/115.1
(58) Field of Classification Search
    USPC ........ 455/67.11, 115.1–115.3, 135, 423, 424, 455/434–444, 500
    See application file for complete search history.

(56) References Cited

U.S. PATENT DOCUMENTS

| 7,366,507 | B2* | 4/2008 | Ammi et al. | 455/423 |
| 7,519,372 | B2* | 4/2009 | MacDonald et al. | 455/456.1 |
| 8,462,758 | B2* | 6/2013 | Yin et al. | 370/344 |
| 8,594,049 | B2* | 11/2013 | Ohta | 370/332 |
| 2008/0307471 | A1* | 12/2008 | Kim et al. | 725/100 |
| 2010/0265092 | A1* | 10/2010 | Kim et al. | 340/825.49 |
| 2011/0153302 | A1* | 6/2011 | Mitsos et al. | 703/11 |
| 2011/0250888 | A1* | 10/2011 | Ryu et al. | 455/436 |

FOREIGN PATENT DOCUMENTS

TW   201006271   2/2010

OTHER PUBLICATIONS

ETSI TS 125 331 V10.4.0 (Jul. 2011) Technical Specification, Universal Mobile Telecommunications System (UMTS); Radio Resource Control (RRC); Protocol specification (3GPP TS 25.331 version 10.4.0 Release 10).

* cited by examiner

*Primary Examiner* — Dominic E Rego
(74) *Attorney, Agent, or Firm* — Winston Hsu; Scott Margo

(57) ABSTRACT

A method of reporting measurement report event first measures the parameters of a plurality of cells and sets a threshold curve for proving a specific standard corresponding to signal quality. If a specific parameter measured from a specific cell among the plurality of cells satisfies an initial trigger condition of a specific measurement report event, the specific measurement report event is reported.

7 Claims, 3 Drawing Sheets

METHOD OF REPORTING MEASUREMENT REPORT EVENTS

BACKGROUND OF THE INVENTION

1. Field of the Invention

The present invention is related to a method of reporting a measurement report event, and more particularly, to a method of reporting a measurement report event with low call drop rate.

2. Description of the Prior Art

A long-term evolution (LTE) system, initiated by the third Generation Partnership Project (3GPP), provides a high data rate, low latency, packet optimization, and improved system capacity and coverage using radio access technology (RAT). In the LTE system, a radio access network known as an evolved universal terrestrial radio access network (E-UT-RAN) is configured to communicate with a user equipment (UE) and a core network (CN). A core network may be a network device such as a mobility management entity (MME) or a serving gateway.

Mobility management in the LTE system mainly includes cell selection/reselection, handover and related measurements. Handover refers to the transfer process of management from a current serving cell to a target cell and is performed in all cellular mobile communication systems. There are two types of handover: hard handover and soft handover. Hard handover may be performed in all non-CDMA (code division multiple access) systems. For example, in a time division multiple access (TDMA) system, the current connection is broken before making a new connection to the target cell. Such break-before-make hard handover only requires simple hardware structure, but suffers from high call drop rate. Soft handover may be performed in all CDMA systems which adopt orthogonal codes and rake receivers. Such make-before-break soft handover can reduce call drop rate during handover, but requires more complicated hardware structure or algorithm.

The cells around a UE can be categorized in 3 different sets: active set, candidate set and monitored set. A cell of the active set is configured to establish connection with a mobile device during handover. A cell of the candidate set does not establish connection with a mobile device during handover, but its signal quality is qualified to be included in the active set. A cell of the monitor set does not have signal quality qualified to be included in the active set. The UE is configured to measure the signals from all cells within its communication range and perform handover accordingly. Soft handover includes three major modes: radio link addition, radio link removal, and radio link replacement. The decision of whether a cell belongs to the active set or the monitor set is made by the UE. According to corresponding trigger conditions, the UE may add an unconnected cell into the active set or remove a connecting cell from the active set.

The network is configured to send measurement criteria to UE via broadcast control channel (BCCH) for managing handover, radio bearer control (RBC) and positioning. The UE is then configured to evaluate whether the signals of the cells in the active set and the monitor set satisfy trigger conditions according the parameters provided by the network. The radio network controller (RNC) is notified when a trigger condition is satisfied for determining whether a corresponding handover should be performed. The parameters provided by the network may include reporting range (RR), hysteresis (H), and weighting parameter (W). These parameters are qualitatively defined in 3GPP specifications, but quantitative calculation or adjustment is performed and dynamically calibrated by the network according the geological environment and loading condition of the cells during setup stage.

For example, the trigger condition of measurement report event 1B associated with radio link removal defined in 3GPP specifications is depicted as follows:

$$10 \cdot \text{Log} M_{OLD} + CIO_{OLD} \leq W \cdot 10 \cdot \text{Log}\left(1 \Big/ \sum_{i=1}^{N_A} (1/M_i)\right) + \quad (1)$$
$$(1-W) \cdot 10 \cdot \text{Log} M_{BEST} - (R_{1b} + H_{1b}/2)$$

$M_i \sim M_{N_A}$, $M_{BEST\ and\ MOLD}$ are primary common pilot channels (CPICHs) of all cells within the communication range, a cell having the best signal quality and a current cell, respectively. Other parameters are clearly defined in 3GPP specifications.

However, the UE may trigger the measurement report event 1B inadequately, thereby causing unnecessary handover. For example, if the parameters are set for a specific environment as W=0, $H_{1b}$=0, $R_{1b}$=4(dB) and $CIO_{OLD}$=-4 (dB), which are applied in equation (1). The resulting equation (2) is depicted as follows:

$$10 \cdot \text{Log} M_{OLD} - 4 \leq 0 + (1-0) \cdot 10 \cdot \text{Log} M_{BEST} - 4 \quad (2)$$

Therefore, the trigger condition of the measurement report event 1B in the specific environment as illustrated by equation (2) is always satisfied regardless of the values of $M_{BEST}$ and $M_{OLD}$. In other works, the cell having the best signal quality may be removed from the active set when the measurement report event 1B is adequately triggered, thereby increasing call drop rate.

SUMMARY OF THE INVENTION

The present invention provides a method of reporting a measurement report event. The method includes measuring parameters of a plurality of cells; determining if a specific parameter measured from a specific cell among the plurality of cells satisfies an initial trigger condition of a specific measurement report event; determining if the specific parameter matches a specific standard associated with a signal quality; and reporting the specific measurement report event if the specific parameter satisfies the initial trigger condition and matches the specific standard at a first point of time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
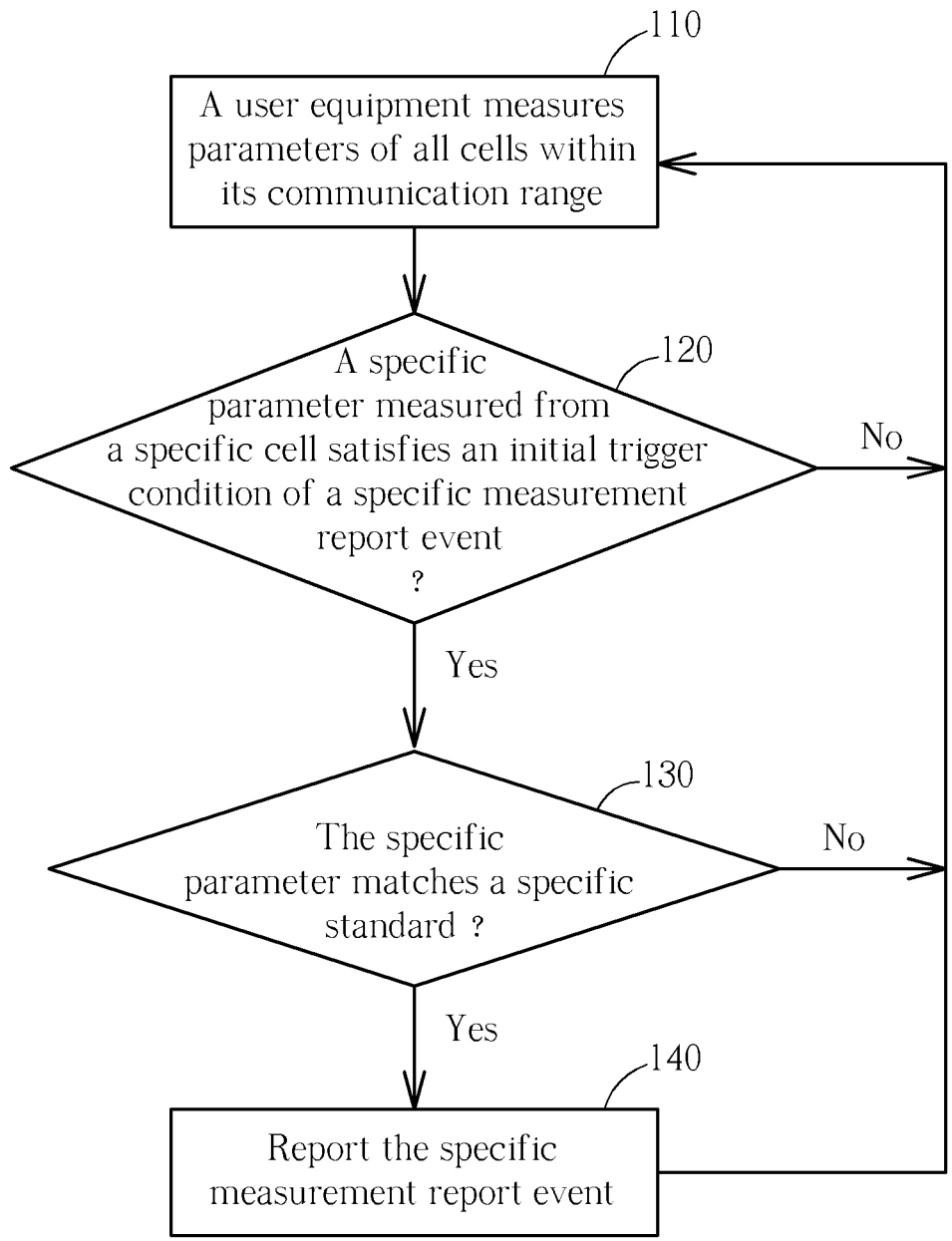
FIG. 1 is a flowchart illustrating a method of reporting a measurement report event according to the present invention.

FIG. 1 is a flowchart illustrating a method of reporting a measurement report event according to the present invention. The flowchart in FIG. 1 includes the following steps:

Step 110: a user equipment measures parameters of all cells within its communication range;

Step 120: determine whether a specific parameter measured from a specific cell satisfies an initial trigger condition of a specific measurement report event; if yes, execute step 130; if no, execute step 110.

Step 130: determine whether the specific parameter matches a specific standard; if yes, execute step 110; if no, execute step 140.

Step 140: report the specific measurement report event, execute step 110.

In the radio resource control (RRC) protocol specifications established by 3GPP, a UE measurement report event may include intra- frequency measurement, inter- frequency measurement, inter-RAT measurement, traffic volume measurement, UE internal measurement, UE positioning measurement, and random access channel (RACH) measurement, etc.

Intra-frequency measurement includes 6 measurement report events reporting events defined as follows:

Event 1A: a primary CPICH enters the reporting range associated with radio link addition);

Event 1B: a primary CPICH leaves the reporting range (associated with radio link removal);

Event 1C: a non-active primary CCPCH becomes better than an active primary CCPCH (associated with radio link replacement);

Event 1D: change of best cell;

Event 1E: a primary CCPCH becomes better than an absolute threshold; and

Event 1F: a primary CCPCH becomes worse than an absolute threshold.

Inter-frequency measurement includes 6 reporting events defined as follows:

Event 2A: change of best frequency;

Event 2B: the estimated quality of the currently used frequency is below a certain threshold and the estimated quality of a non-used frequency is above a certain threshold;

Event 2C: the estimated quality of a non-used frequency is above a certain threshold;

Event 2D: the estimated quality of the currently used frequency is below a certain threshold;

Event 2E: the estimated quality of a non-used frequency is below a certain threshold; and Event 2F: the estimated quality of the currently used frequency is above a certain threshold.

Inter-RAT measurement includes 4 reporting events defined as follows:

Event 3A: the estimated quality of the currently used UTRAN frequency is below a certain threshold and the estimated quality of the other system is above a certain threshold;

Event 3B: the estimated quality of other system is below a certain threshold;

Event 3C: the estimated quality of other system is above a certain threshold.

Event 3D: change of best cell in other system

Traffic volume measurement includes 2 reporting events defined as follows:

Event 4A: transport channel traffic volume exceeds an absolute threshold; and

Event 4B: transport channel traffic volume becomes smaller than an absolute threshold.

Quality measurement includes 1 reporting event defined as follows:

Event 5A: a predefined number of bad cycle redundancy checks (CRCs) is exceeded.

UE internal measurement includes 7 reporting events defined as follows:

Event 6A: the UE transmitting power becomes larger than an absolute threshold;

Event 6B: the UE transmitting power becomes less than an absolute threshold;

Event 6C: the UE transmitting power reaches its minimum value;

Event 6D: the UE transmitting power reaches its maximum value;

Event 6E: the UE received signal strength indicator (RSSI) reaches the UE's dynamic receiver range;

Event 6F: the UE receiving-transmitting time difference becomes larger than an absolute threshold; and Event 6G: the UE receiving-transmitting time difference becomes smaller than an absolute threshold.

Figure 2:
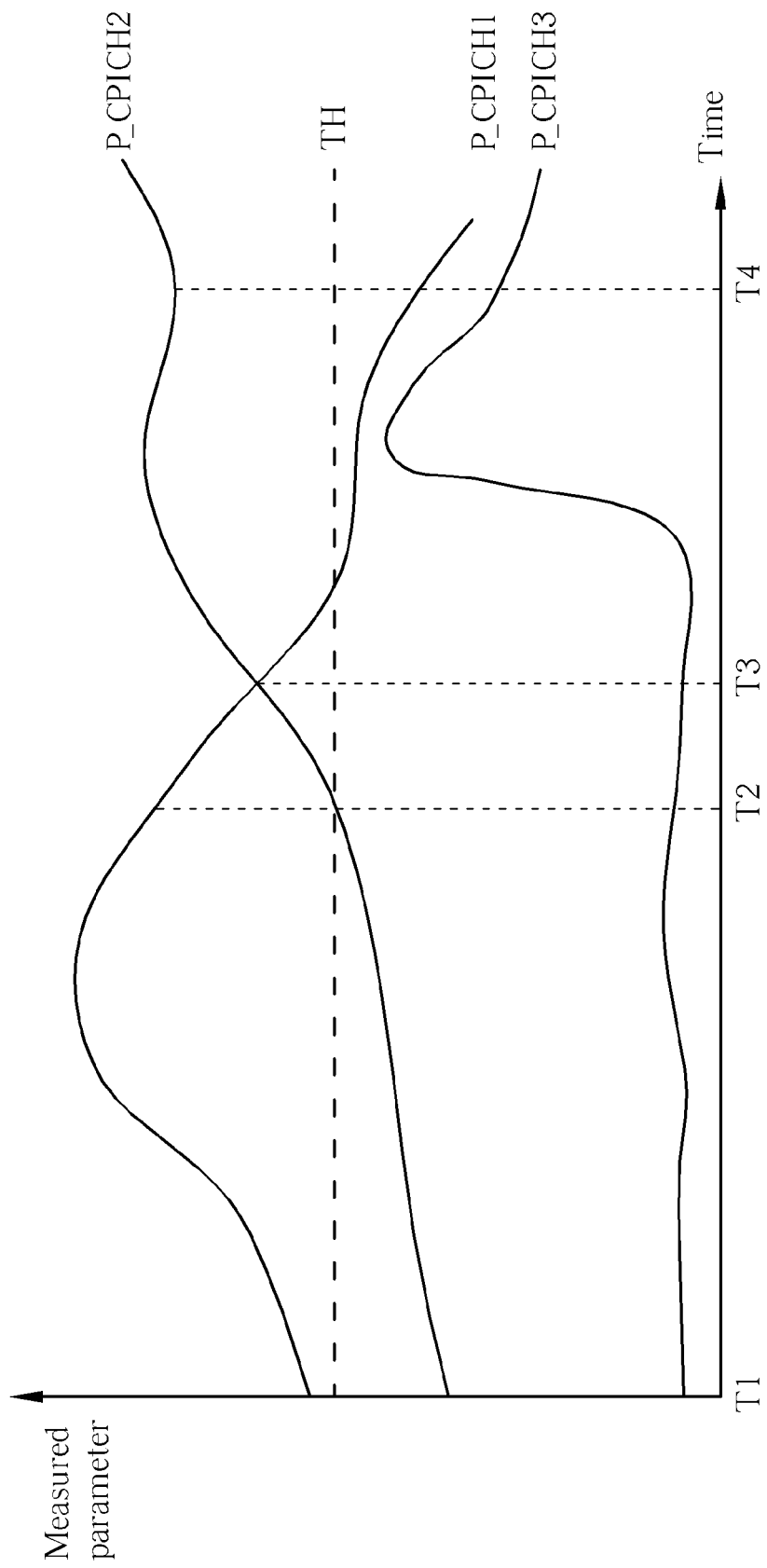
FIGS. 2 and 3 are diagrams illustrating methods of reporting a measurement report event according to embodiments of the present invention.

For ease of explanation, measurement report event 1B of intra-frequency measurement is used for illustrating the embodiment of FIG. 2. Therefore, the specific parameter measured in step 210 maybe the primary CPICHs of all cells within the communication range, while the initial trigger condition may be illustrated by equation (1). Meanwhile, the specific standard may be associated with signal quality of the cells.

Figure 3:
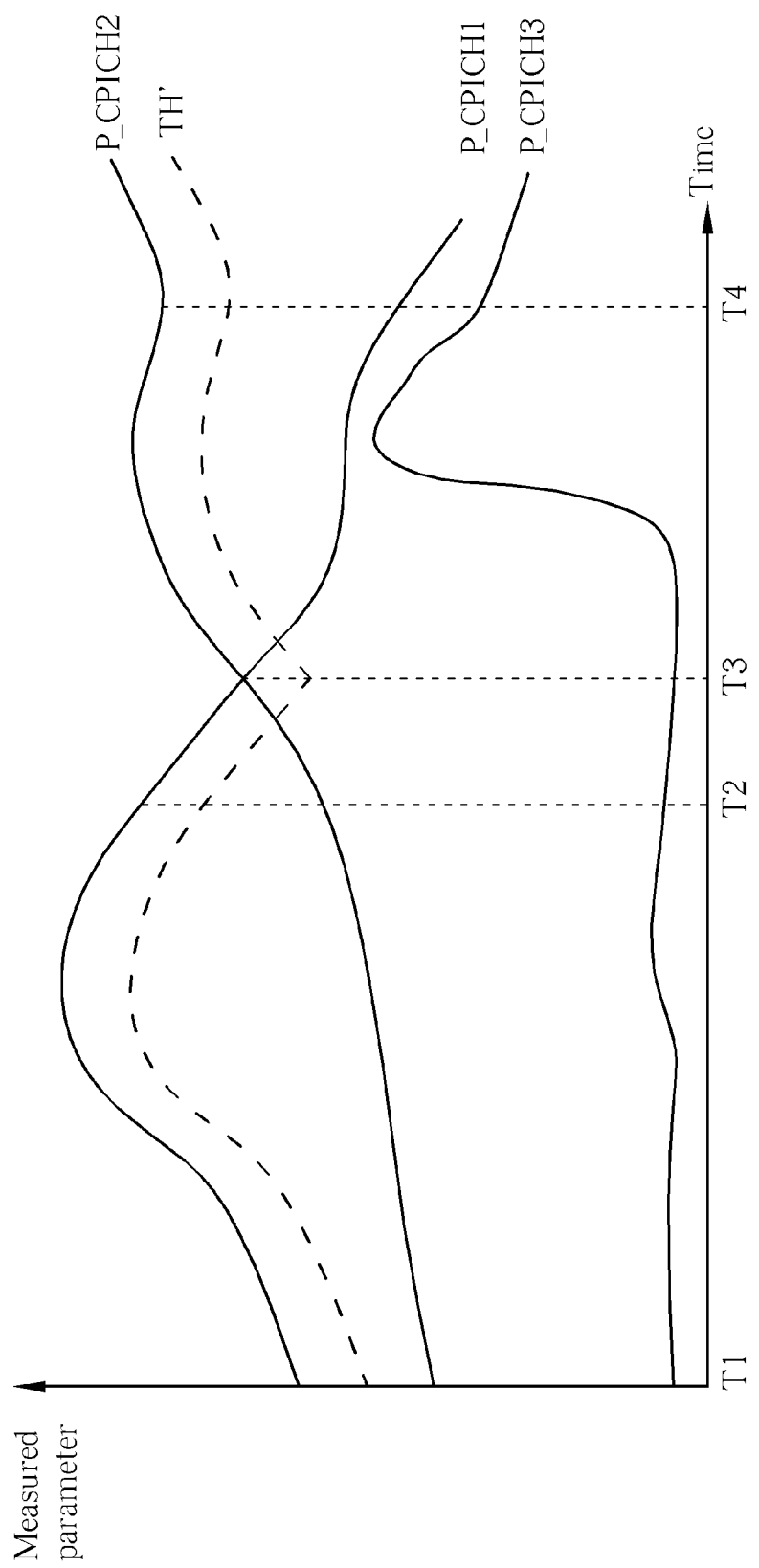

FIGS. 2 and 3 are diagrams illustrating methods of reporting a measurement report event according to embodiments of the present invention. The vertical axis depicts the specific parameters measured from 3 cells within the communication range of the UE, such as primary common pilot channels P_CPICH1~P_CPICH3. The horizontal axis depicts time. In the embodiment illustrated in FIG. 2, a threshold curve TH with constant value is provided as the specific standard; in the embodiment illustrated in FIG. 3, a threshold curve TH' whose value is associated with the signal measured from a best cell is provided as the specific standard. When the primary common pilot channel of a certain cell exceeds the threshold curve at a certain point of time, the cell is determined to have good signal quality. Under such circumstance, the present invention does not report event 1B even if the primary common pilot channel of the cell satisfies the initial trigger condition of event 1B.

If it is determined in step 120 that the primary common pilot channel P_CPICH1 measured from a first cell satisfies the initial trigger condition of event 1B at T2, step 130 is then executed, thereby determining that the primary common pilot channel P_CPICH1 exceeds the threshold curve TH or TH'. Under such circumstance, the present invention does not report event 1B at T2. If it is determined in step 120 that the primary common pilot channel P_CPICH1 satisfies the initial trigger condition of event 1B at T4, step 130 is then executed, thereby determining that the primary common pilot channel P_CPICH1 does not exceed the threshold curve TH or TH'. Under such circumstance, the present invention proceeds to execute step 140 for reporting event 1B at T4.

Similarly, if it is determined in step 120 that the primary common pilot channel P_CPICH2 measured from a second cell satisfies the initial trigger condition of event 1B at a point of time between T1 and T2, step 130 is then executed, thereby determining that the primary common pilot channel P_CPICH2 does not exceed the threshold curve TH or TH'. Under such circumstance, the present invention proceeds to execute step 140 for reporting event 1B at the corresponding point of time. If it is determined in step 120 that the primary common pilot channel P_CPICH2 satisfies the initial trigger condition of event 1B at a point of time between T2 and T4, step 130 is then executed, thereby determining that the primary common pilot channel P_CPICH2 exceeds the threshold curve TH or TH'. Under such circumstance, the present invention does not report event 1B at the corresponding point of time.

Since the primary common pilot channel P_CPICH3 measured from a third cell does not exceed the threshold curve TH or TH', the present invention does not report event 1B even if it is determined in step 120 that the primary common pilot channel P_CPICH3 satisfies the initial trigger condition of event 1B anytime between T1~T4.

In other words, the present invention ensures that no handover is performed on the cell having the best signal quality (the first cell between T1 and T3, or the second cell between T3 and T4). Therefore, when operating in a specific environment whose setup may be illustrated by equation (1), the present invention can prevent the cell having the best signal quality from being removed from the active set inadequately.

Although the above embodiments are illustrated using measurement report event 1B of intra-frequency measurement, the present invention may also adopt other UE measurement report events for managing handover between cells, frequencies or systems.

Regarding radio link removal, it is determined in step 130 that the specific parameter matches the specific standard when the measured primary common pilot channel is smaller than a predetermined value.

However, regarding radio link addition, it maybe determined in step 130 that the specific parameter matches the specific standard when the measured primary common pilot channel is larger than a predetermined value. In other words, the present invention can prevent the cell having the worst signal quality from being added into the active set inadequately when operating in a specific environment. In the present invention, the definition of "match" in step 130 depends on different measurement report events. FIGS. 2 and 3 are merely for illustrative purposes and do not limit the scope of the present invention.

In conclusion, when a specific parameter measured from a specific cell satisfies an initial trigger condition of a specific measurement report event, the present invention further determines whether the signal quality of the specific cell matches a specific standard, thereby deciding whether the specific measurement report event should be reported. Therefore, the present invention can reduce call drop rate by preventing the cell having the best signal quality from being removed from the active set inadequately, or by preventing the cell having the worst signal quality from being added into the active set inadequately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reporting a measurement report event, comprising:
    measuring parameters of a plurality of cells;
    determining if a specific parameter measured from a specific cell among the plurality of cells satisfies an initial trigger condition of a specific measurement report event;
    determining if the specific parameter matches a specific standard associated with a signal quality; and
    reporting the specific measurement report event if the specific parameter satisfies the initial trigger condition and matches the specific standard at a first point of time.

2. The method of claim 1, further comprising:
    providing a threshold curve of a constant value as the specific standard.

3. The method of claim 1, further comprising:
    providing a threshold curve as the specific standard according to a parameter measured from a best cell having a best signal quality among the plurality of cells.

4. The method of claim 1, wherein:
    the specific cell is included in an active set;
    the specific measurement report event is associated with a handover associated with an radio link removal; and
    the method further comprises:
        measuring a primary common pilot channel of the specific cell as the specific parameter;
        determining that the primary common pilot channel matches the specific standard if the primary common pilot channel does not exceed a threshold value at the first point of time when satisfying the initial trigger condition; and
        reporting the specific measurement report event for removing the specific cell from the active set.

5. The method of claim 4, further comprising:
    determining that the primary common pilot channel does not match the specific standard if the primary common pilot channel exceeds the threshold value at a second point of time when satisfying the initial trigger condition; and
    keeping the specific cell in the active set by not reporting the specific measurement report event.

6. The method of claim 1, wherein:
    the specific cell is included in a monitor set;
    the specific measurement report is associated with a handover associated with radio link addition; and
    the method further comprises:
        measuring a primary common pilot channel of the specific cell as the specific parameter;
        determining that the primary common pilot channel matches the specific standard if the primary common pilot channel exceeds a threshold value at the first point of time when satisfying the initial trigger condition; and
        reporting the specific measurement report event for adding the specific cell into a active set.

7. The method of claim 6, further comprising:
    determining that the primary common pilot channel does not match the specific standard if the primary common pilot channel does not exceed the threshold value at a second point of time when satisfying the initial trigger condition; and
    keeping the specific cell in the monitor set by not reporting the specific measurement report event.

* * * * *